United States Patent
Linzer et al.

(10) Patent No.: US 10,021,396 B1
(45) Date of Patent: Jul. 10, 2018

(54) MOTION DETECTION BASED ON OBSERVING SEVERAL PICTURES

(71) Applicant: Ambarella, Inc., Santa Clara, CA (US)

(72) Inventors: Elliot N. Linzer, Bergenfield, NY (US); Leslie D. Kohn, Saratoga, CA (US)

(73) Assignee: Ambarella, Inc., Santa Clara, CA (US)

( * ) Notice: Subject to any disclaimer, the term of this patent is extended or adjusted under 35 U.S.C. 154(b) by 440 days.

(21) Appl. No.: 14/636,618

(22) Filed: Mar. 3, 2015

Related U.S. Application Data

(60) Provisional application No. 62/097,663, filed on Dec. 30, 2014.

(51) Int. Cl.
| | |
|---|---|
| *H04N 19/139* | (2014.01) |
| *H04N 19/117* | (2014.01) |
| *H04N 19/172* | (2014.01) |
| *H04N 19/58* | (2014.01) |
| *H04N 19/105* | (2014.01) |

(52) U.S. Cl.
CPC ......... *H04N 19/139* (2014.11); *H04N 19/105* (2014.11); *H04N 19/117* (2014.11); *H04N 19/172* (2014.11); *H04N 19/58* (2014.11)

(58) Field of Classification Search
CPC .... H04N 19/139; H04N 19/117; H04N 19/58; H04N 19/105; H04N 19/172
USPC ..................................... 375/240.16
See application file for complete search history.

(56) References Cited

U.S. PATENT DOCUMENTS

| | | | | |
|---|---|---|---|---|
| 9,215,355 | B2* | 12/2015 | Chen | G06T 5/002 |
| 2007/0014368 | A1* | 1/2007 | MacInnis | H04N 5/21 375/240.24 |
| 2009/0086816 | A1* | 4/2009 | Leontaris | H04N 19/80 375/240.03 |
| 2011/0090960 | A1* | 4/2011 | Leontaris | H04N 19/103 375/240.12 |
| 2011/0242422 | A1* | 10/2011 | Hong | H04N 5/2176 348/614 |

* cited by examiner

*Primary Examiner* — William C Vaughn, Jr.
*Assistant Examiner* — Naod Belai
(74) *Attorney, Agent, or Firm* — Christopher P. Maiorana, PC

(57) ABSTRACT

A method for motion detection based on observing several pictures is disclosed. Step (A) may compute a first motion score of an area in a target picture by a comparison of the area between the target picture and a first reference picture. Step (B) may compute a second motion score of the area by another comparison of the area between the target picture or a second reference picture and a third reference picture. Step (C) may temporal filter the target picture with the first reference picture based on the first motion score and the second motion score. At least one of the computing of the first motion score, the computing of the second motion score, and the temporal filtering may be controlled by one or more gain settings in a circuit. At least two of the first, the second, and the third reference pictures may be different pictures.

16 Claims, 6 Drawing Sheets

MOTION DETECTION BASED ON OBSERVING SEVERAL PICTURES

This application relates to U.S. Provisional Application No. 62/097,663, filed Dec. 30, 2014, which is hereby incorporated by reference in its entirety.

FIELD OF THE INVENTION

The present invention relates to motion detection for video temporal filtering generally and, more particularly, to methods and/or apparatus for motion detection based on observing several pictures.

BACKGROUND OF THE INVENTION

Conventional motion detection looks at a local error measure, commonly a sum-of-absolute-differences, between a target picture and a reference picture. Even if no motion exists, such local error measures tend to be non-zero due to noise and changes in scene lightness. Therefore, motion detection commonly detects small differences between the pictures as no motion and detects big differences as motion. Temporal filtering is used to combine a target picture with a motion compensated reference picture, and uses strong filtering where no motion is detected.

It would be desirable to implement motion detection based on observing several pictures.

SUMMARY OF THE INVENTION

The present invention concerns a method for motion detection based on observing several pictures. Step (A) may compute a first motion score of an area in a target picture by a comparison of the area between the target picture and a first reference picture. Step (B) may compute a second motion score of the area by another comparison of the area between the target picture or a second reference picture and a third reference picture. Step (C) may temporal filter the target picture with the first reference picture based on the first motion score and the second motion score. At least one of the computing of the first motion score, the computing of the second motion score, and the temporal filtering may be controlled by one or more gain settings in a circuit. At least two of the first, the second, and the third reference pictures may be different pictures.

The objects, features and advantages of the present invention include providing motion detection based on observing several pictures that may (i) use motion detection between two different pairs of pictures to determine how to apply a temporal filter between a pair of the pictures, (ii) use motion detection between non-adjacent pictures to determine how to temporal filter between adjacent pictures, and/or (iii) detect motion based on motion between several picture pairs.

BRIEF DESCRIPTION OF THE DRAWINGS

These and other objects, features and advantages of the present invention will be apparent from the following detailed description and the appended claims and drawings in which:

DETAILED DESCRIPTION OF EMBODIMENTS

Motion detection may be used in many applications, such as security cameras, and/or in many operations, such as motion compensated temporal filtering (e.g., MCTF) a sequence of pictures (or images). For the motion compensated temporal filtering, a filter may adaptively combine one or more reference (or previous) pictures and a target (or current) picture of the sequence based on detected motion in the target picture relative to the reference pictures. The filtering may also decide locally how to combine the multiple pictures (e.g., fields and/or frames) to reduce noise while limiting filter-created artifacts.

Typically, the filter may favor a reference picture more the more the filter determines that no motion exists in a local area relative to the reference picture. For such a filter, motion may mean motion in an absolute sense, if motion exists. In various embodiments, the reference pictures may be pre-transformed per a motion model (e.g., a process used to estimate motion between the pictures). The transformed (motion compensated) reference pictures may be subsequently combined with the target picture. For a motion compensated temporal filtering case, motion generally means motion between the motion compensated reference pictures and the target picture. For a non-motion compensated temporal filtering case, motion generally means motion between the non-compensated reference pictures and the target picture.

Figure 1:
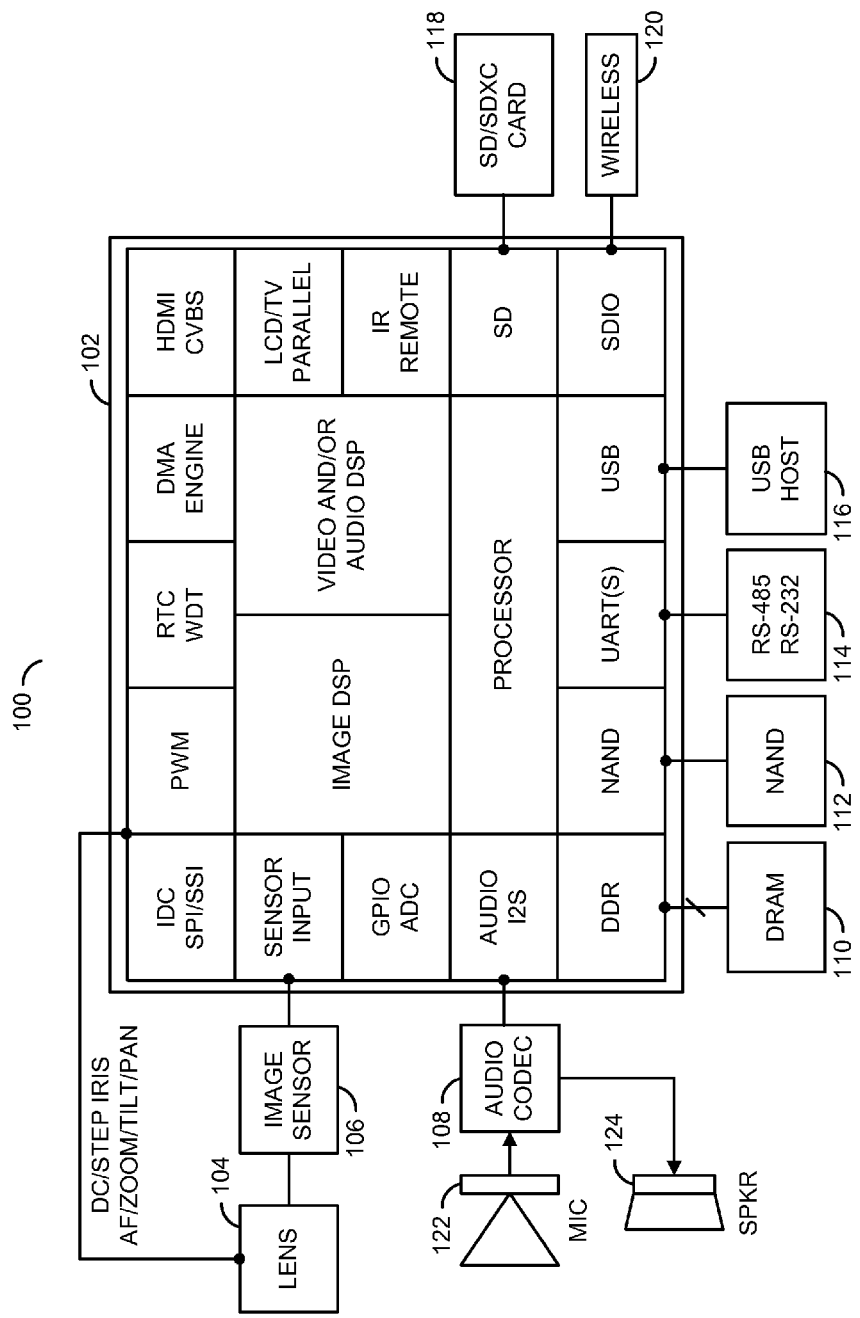
FIG. 1 is a block diagram of a camera system.

Referring to FIG. 1, a block diagram of a camera system 100 is shown illustrating an example implementation of a camera/recorder system (or apparatus). In some embodiments, the camera system 100 may be a digital video camera, a digital still camera or a hybrid digital video/still camera. In an example, the electronics of the camera system 100 may be implemented as one or more integrated circuits. For example, an application specific integrated circuit (e.g., ASIC) or system-on-a-chip (e.g., SOC) may be used to implement a processing portion of the camera system 100. In various embodiments, the camera system 100 may comprise a camera chip (or circuit) 102, a lens assembly 104, an image sensor 106, an audio codec 108, dynamic random access memory (e.g., DRAM) 110, non-volatile memory (e.g., NAND flash memory, etc.) 112, one or more serial interfaces 114, an interface 116 for connecting to or acting as a universal serial bus (e.g., USB) host, an interface for connecting to a removable media 118 (e.g., SD—secure digital media, SDXC—secure digital extended capacity media, etc.), a wireless interface 120 for communicating with a portable user device, a microphone 122 for recording audio, and a speaker 124 for playing audio. In some embodiments, the lens assembly 104 and the image sensor 106 may be part of a separate camera connected to the processing portion of the system 100 (e.g., via a video cable, a high definition media interface (e.g., HDMI) cable, a USB cable, an ethernet cable, or wireless link).

In various embodiments, the circuit 102 may comprise a number of modules (or circuits) including, but not limited to, a pulse width modulation (e.g., PWM) module, a real time clock and watchdog timer (RTC/WDT), a direct memory access (e.g., DMA) engine, a high-definition multimedia interface (e.g., HDMI), an LCD/TV/Parallel interface, a general purpose input/output (e.g., GPIO) and an analog-to-digital converter (e.g., ADC) module, an infrared (e.g., IR) remote interface, a secure digital input output (e.g., SDIO) interface module, a secure digital (e.g., SD) card interface, an audio inter-IC sound (e.g., I2S) interface, an image sensor input interface, and a synchronous data communications interface (e.g., IDC SPI/SSI). The circuit 102 may also include an embedded processor (e.g., ARM, etc.), an image digital signal processor (e.g., DSP), and a video and/or audio DSP. In embodiments incorporating the lens assembly 104 and image sensor 106 in the system 100, the circuit 102 may be configured (e.g., programmed) to control the lens assembly 104 and receive image data from the sensor 106. The wireless interface 120 may include support for wireless communication by one or more wireless protocols such as Bluetooth®, ZigBee®, Institute of Electrical and Electronics Engineering (e.g., IEEE) 802.11, IEEE 802.15, IEEE 802.15.1, IEEE 802.15.2, IEEE 802.15.3, IEEE 802.15.4, IEEE 802.15.5, and/or IEEE 802.20. The circuit 102 may also include support for communicating using one or more of the universal serial bus protocols (e.g., USB 1.0, 2.0, 3.0, etc.). The circuit 102 may also be configured to be powered via the USB connection. However, other communication and/or power interfaces may be implemented accordingly to meet the design criteria of a particular implementation.

In various embodiments, programming code (e.g., executable instructions for controlling various processors of the circuit 102) implementing a temporal filter with noise-robust and/or slow-motion robust motion detection may be stored in one or more of the memories 110 and 112. When executed by the circuit 102, the programming code generally causes the circuit 102 to receive a sequence of pictures from the sensor 106, temporal filter based on measurements if an area is stationary for several pictures, temporal filtering based on motion detection on small and big areas, temporal filter based on comparing down-sampled pictures, and/or temporal filtering of adjacent pictures based on motion detection of non-adjacent pictures.

For noisy image sequences, the differences between pictures, even in stationary areas, may be large since the noise in each picture is different. Moreover, slow motion tends to add only small amounts to motion scores. Therefore, conventional motion detection may fail to correctly detect slow motion and/or motion in noisy sequences of pictures. False positives (e.g., detecting motion where none exists) may result in too-noisy output pictures. False negatives (e.g., not detecting actual motion) may result in temporal artifacts. Various embodiments of the present invention generally contain one or more of the following features that may be used individually or in combination to make temporal filtering based on motion compensation more robust.

Motion detection may be based on observing if the video is stationary or moving for several pictures (or frames or fields). Specifically, for the same location, scores are generally used from multiple picture comparisons. By incorporating extra data into the still or moving decision, the detection may be more robust.

Temporal filtering of adjacent pictures may be based on motion detection of non-adjacent pictures. Adjacent pictures may be combined with a temporal filtering because adjacent pictures are generally more similar to each other than non-adjacent pictures. For slow motion, non-adjacent pictures may exhibit greater motion and, therefore, may exhibit higher motion scores than adjacent pictures. Performing detection on non-adjacent pictures (e.g., a target picture and a non-adjacent reference picture) may provide a more robust detection of slow motion, especially in the presence of noise.

Figure 2:
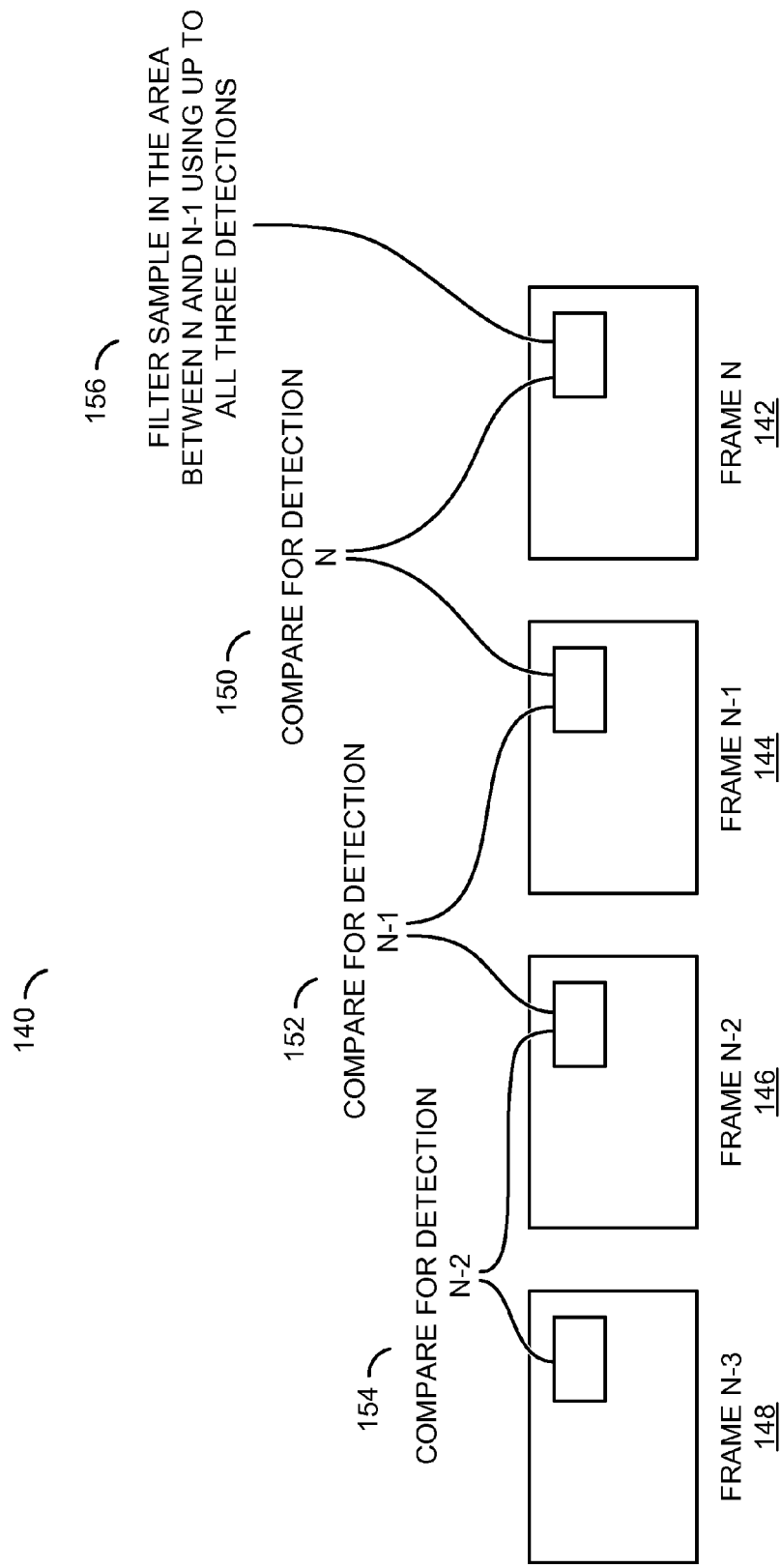
FIG. 2 is a graphical representation of several motion detections.

Referring to FIG. 2, a graphical representation 140 of several motion detections is shown. Consider a sequence of several frames N to N-3 (e.g., reference numbers 142 to 148). A motion detection 150 generally detects motion between a target frame N (142) and a reference frame N-1 (144). Another motion detection may be used to seek earlier motion. A motion detection 152 generally detects motion between the reference frame N-1 (144) and a reference frame N-2 (146). Still another motion detection 154 may detect motion between the reference frame N-2 (146) and a reference frame N-3 (148). Up to all of the detections 150, 152, and 154 may be used to filter (156) samples between an area in the target frame N (142) and the area the reference frame N-1 (144). While the example uses two earlier detections (e.g., the detection 152 and the detection 154), any number of detections greater than a single detection may be used. The area may range from a single pixel to many pixels (e.g., 4×4, 8×8, 16×16, 32×32, or 64×64 blocks of pixels).

Figure 3:
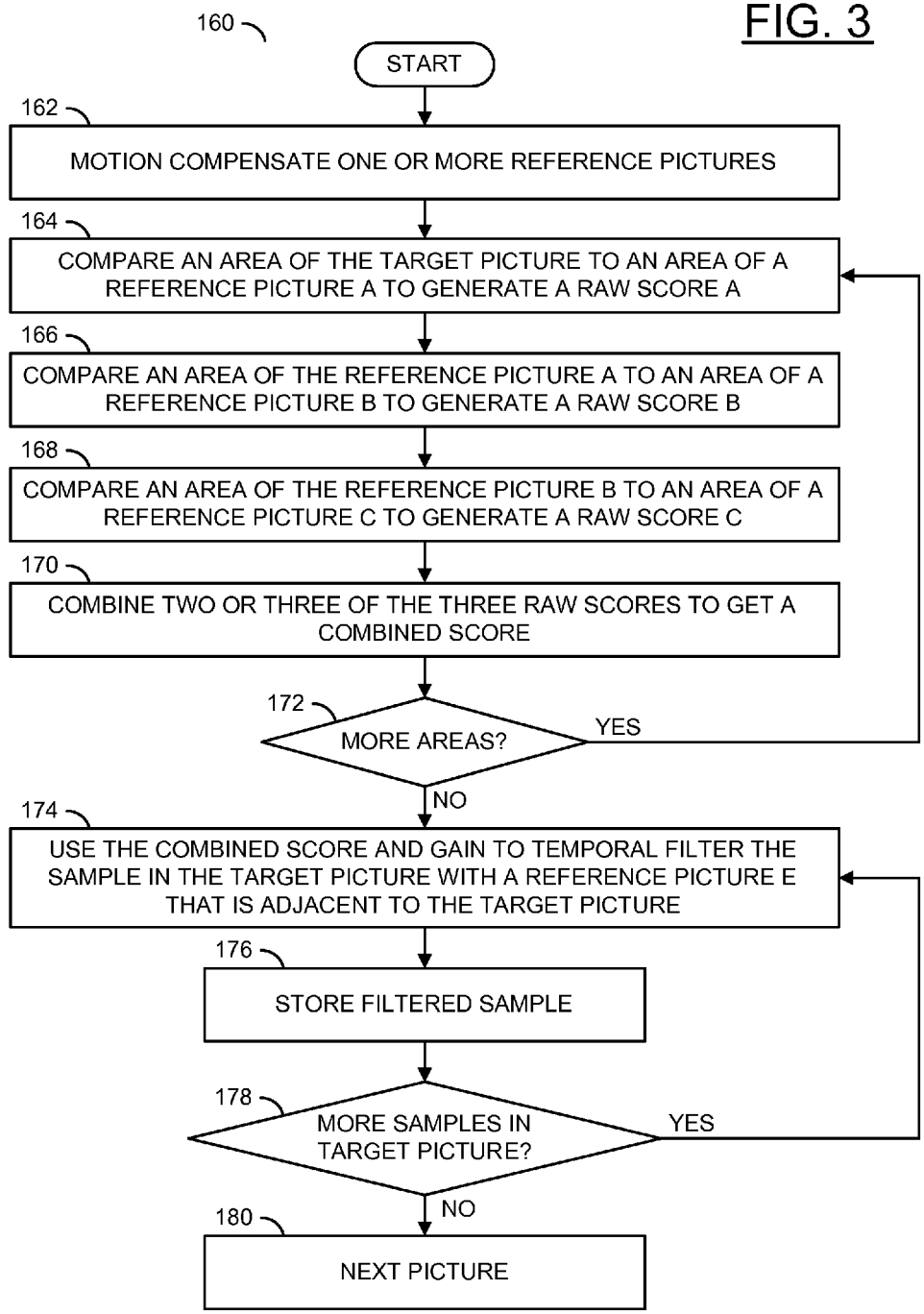
FIG. 3 is a flow diagram of a motion detection method in accordance with a preferred embodiment of the present invention.

Referring to FIG. 3, a flow diagram of a motion detection method 160 is shown in accordance with a preferred embodiment of the present invention. The method (or process) 160 may be performed by the circuit 102. The method 160 generally comprises a step (or state) 162, a step (or state) 164, a step (or state) 166, a step (or state) 168, a step (or state) 170, a decision step (or state) 172, a step (or state) 174, a step (or state) 176, a decision step (or state) 178, and a step (or state) 180. The steps 162-180 may be implemented in hardware, software, firmware or any combination thereof in an apparatus (or circuit or device). The sequence of the steps is shown as a representative example. Other step orders may be implemented to meet the criteria of a particular application.

In the step 162, the circuit 102 may motion compensate one or more reference pictures (e.g., the frames N-1, N-2, N-3, etc.). The circuit 102 may compare an area of the target picture (e.g., the frame N) to a spatially co-located area of a reference picture A (e.g., the frame N-1) in the step 164 to generate a raw score A (e.g., a target motion score). In some embodiments, the reference picture A may not be temporally adjacent to the target picture N (e.g., the reference picture A may be the frame N-2). In other embodiments, the reference picture A may be temporally adjacent to the target picture N (e.g., the reference picture A may be the frame N-1). In the step 166, the area of the reference picture A may be compared with the spatially co-located area of another reference picture B (e.g., the frame N-2) to generate another raw score B (e.g., an additional motion score). The area of the reference picture B may be compared in the step 168 to the spatially co-located area of a reference picture C (e.g., the frame N-3) to generate a raw score C (e.g., another motion score). The circuit 102 may combine two or three of the three raw scores A, B and/or C in the step 170 to generate a combined score. The decision step 172 generally determines if additional detections may be useful in one or more additional areas. If the additional detections may be useful, the steps 164-170 may be repeated.

In the step 174, the circuit 102 may use the combined score and a gain value, applied by the circuits 102 and/or 106, to temporal filter a target sample in the area of the target picture N with another reference picture E. The reference picture E (e.g., frame N-1 or N+1) may be temporally adjacent to the target picture N. In the step 176, the filtered target sample may be stored in one or more of the memories (e.g., the memory 110).

A check may be performed in the decision step 178 to determine if any more target samples exist in the current target picture N. If more target samples have yet to be processed, the method 160 may move to the next unprocessed target sample and return to the temporal filter process (e.g., the step 174). Once all of the target samples in the current target picture N have been processed, the method 160 may continue in the step 180 with the target samples in the next picture.

The gain settings in the camera system 100 may include an analog gain and/or a digital gain in the image sensor 106, and/or a digital gain in the circuit 102. One or more of such settings may be considered in the temporal filtering. Furthermore, offset settings, exposure settings and/or aperture settings may also be considered in the temporal filtering. The circuit 102 generally controls the lens assembly 104 and/or the image sensor 106 for an automatic exposure operation. Changes in the automatic exposure may change the light levels in the image data received from the sensor 106. The gain settings affect the noise in pictures; therefore, any of the steps computing the various scores (e.g., the steps 164, 166 and/or 168), combining the scores (e.g., the step 170), and/or using the scores for temporal filtering (e.g., the step 174) may be controlled based on the gain settings, offset settings, exposure settings and/or aperture settings.

The scores computed in the steps 164, 166 and/or 168 may be any score that is generally higher when motion exists between pictures. The scores may include, but are not limited to, sum-of-absolute-differences and sum-of-squared-differences. The scores may further be modified based on tone (e.g., brightness and/or color) as described in co-pending U.S. patent application Ser. No. 14/580,867, filed Dec. 23, 2014, which is hereby incorporated by reference in its entirety.

Figure 5:
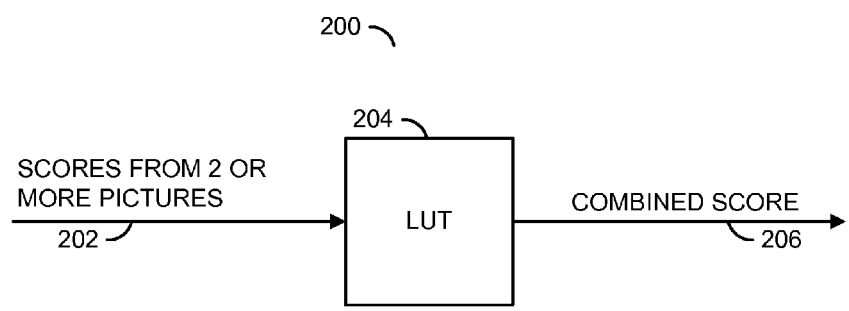
FIG. 5 is a diagram of a score combination by lookup.
Figure 6:
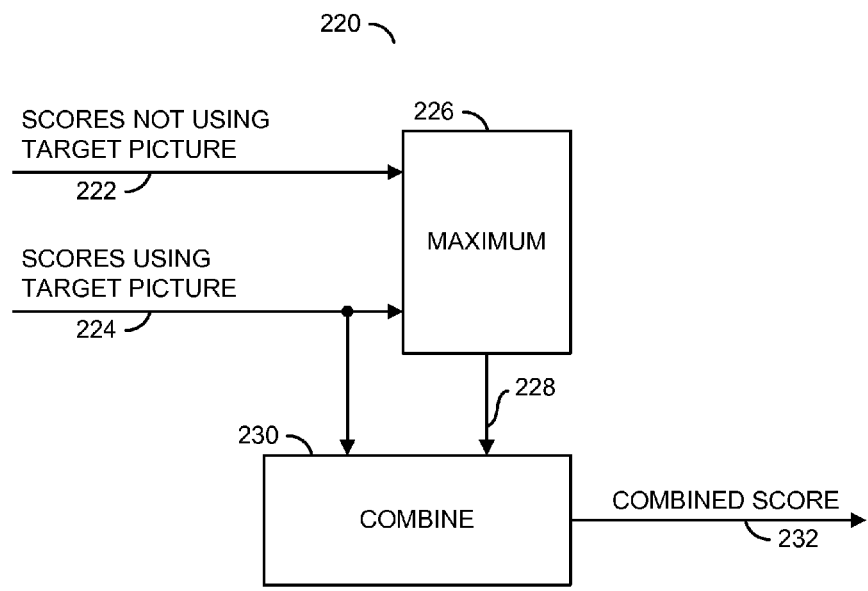
FIG. 6 is a diagram of a score combination using maximum and two-dimensional combining.

The steps 164-168 generally show three picture comparisons. In general, more or fewer picture comparisons may be implemented to meet the criteria of a particular application. The combining operations may use lookup tables and/or mathematical transformations to generate the combined motion scores. The step 170 generally shows combining two or more scores from different pictures. FIGS. 5 and 6 may illustrate embodiments of various combination operations. Other comparisons between the target frame N (142) and the reference frames may be implemented.

Figure 4:
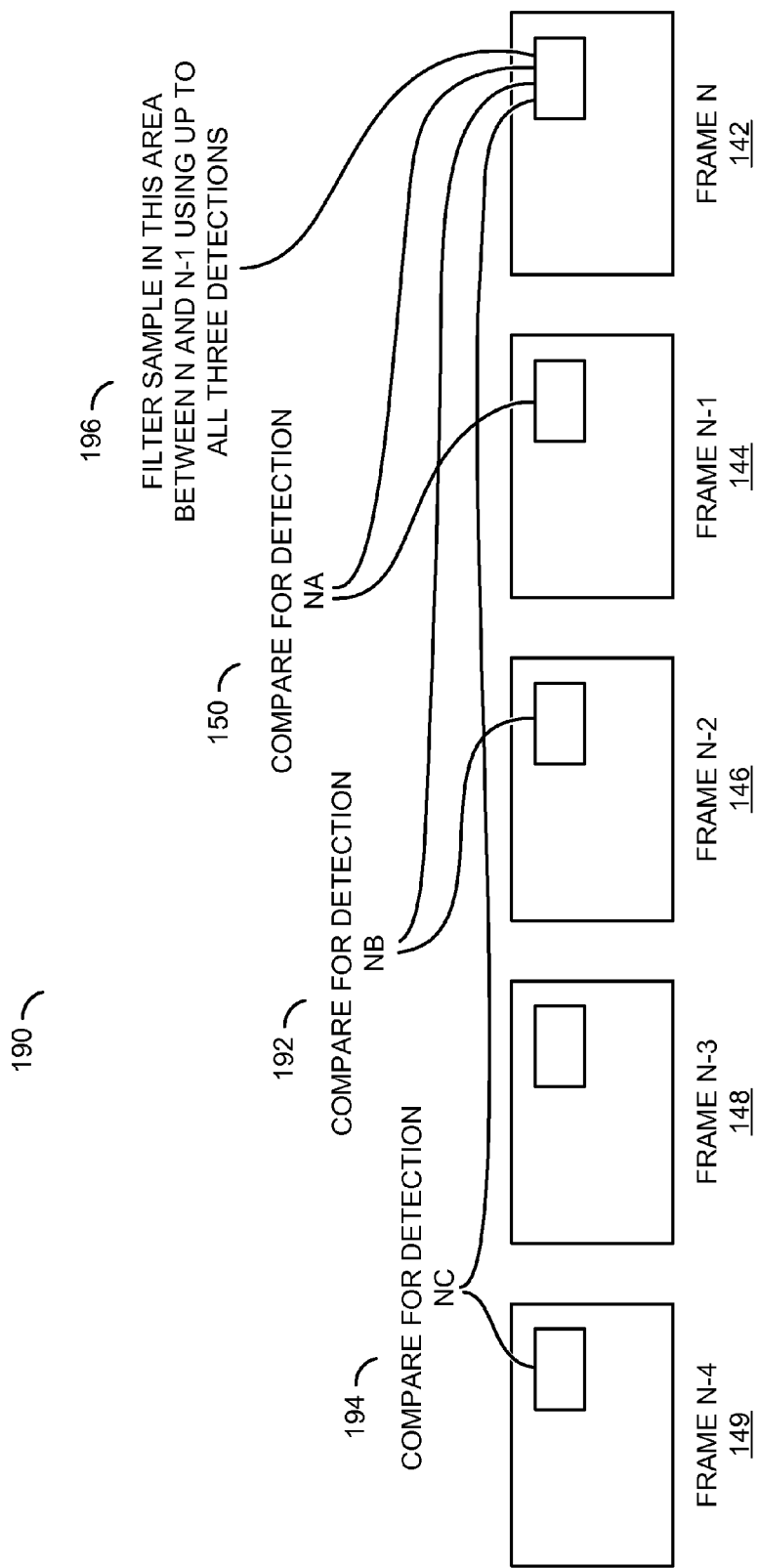
FIG. 4 is another graphical representation of several motion detections.

Referring to FIG. 4, a graphical representation 190 of several motion detections is shown. Consider a sequence of multiple frames N to N−4 (e.g., reference numbers 142 to 149). As in the representation 140, the motion detection 150 generally detects motion between the target frame N (142) and the reference frame N−1 (144). The detected motion may establish (e.g., the step 164 in FIG. 3) the raw score A. Another motion detection 192 may detect motion between the target frame N (142) and the reference frame N−2 (146) to calculate the raw score B. The motion detection 192 may be a variation of the step 166. In various embodiments, a motion detection 194 may detect motion between the target frame N (142) and the reference frame N−4 (149) to calculate the raw score C. The motion detection 194 may be a variation of the step 168. In some embodiments, the motion detection 194 may be between the target frame N (142) and the reference frame N−3 (148). In other embodiments, the motion detection 194 may be between two of the reference frames (e.g., between the reference frame N−3 and the reference frame N−4).

The step 170 may combine two or three of the raw scores A, B and/or C to calculate the combined score. The circuit 102 may use the combined score and the gain value in the step 174 to temporal filter a target sample in the area of the target picture N with the reference picture E. The reference picture E (e.g., frame N−1 or N+1) may be temporally adjacent to the target picture N. In the step 176, the filtered target sample may be stored in one or more of the memories (e.g., the memory 110). Thereafter, additional target samples and additional target pictures may be filtered.

Referring to FIG. 5, a diagram of an example score combination 200 by lookup table is shown. A signal 202 may carry scores from two or more frames to a multi-dimensional lookup table (e.g., LUT) 204. An entry (or value) stored in the LUT 204 at an index formed by the scores may be presented from the LUT 204 as a combined score in a signal 206.

Referring to FIG. 6, a diagram of an example score combination circuit (or module) 220 using maximum selection and two-dimensional combining is shown. The scores that do not use the target frame N may be received via a signal 222 by a maximum circuit (or module) 226. The scores that use the target frame N may be received by the maximum circuit 226 and a combine circuit (or module) 230 via a signal 224. The circuit 226 is generally operational to select a maximum score (or value) among the received scores. The maximum score may be passed in a signal 228 to the circuit 230. The circuit 230 is generally operational to perform a two-dimensional lookup or mathematical operations on the scores received in the signals 224 and 228 to generate and present a combined score in a signal 232.

Various embodiments of the circuit 230 may implement a two-dimensional (e.g., a dimension for the signal 224 and another dimension for the signal 228) lookup. Other embodiments of the circuit 230 generally select the highest score in the signal 228. Some embodiments of the circuit 230 may transform the maximum score per formula 1 as follows:

$$\text{Combined\_score} = ((\text{Max\_score} - \text{SUB}) \times \text{MUL}) \tag{1}$$

Where a subtraction value SUB and a multiplication value MUL may be controllable parameters, and where a value Max_score may be the maximum score in the signal 228. Still other embodiments may transform the maximum score with the score in the signal 224 as follows:

If(Max_score<THR) Combined_score=0;
else {
  A=(CUR−SUB)×MUL)
  Combined_score=max(Min_score, A)
}

Where a threshold THR, a minimum score Min_score, the subtraction value SUB and the multiplication value MUL may be controllable parameters. A current value CUR may be the score that uses the target picture N in the signal 224. The temporal filtering may combine the target picture N and a reference picture using a blending curve.

Figure 7:
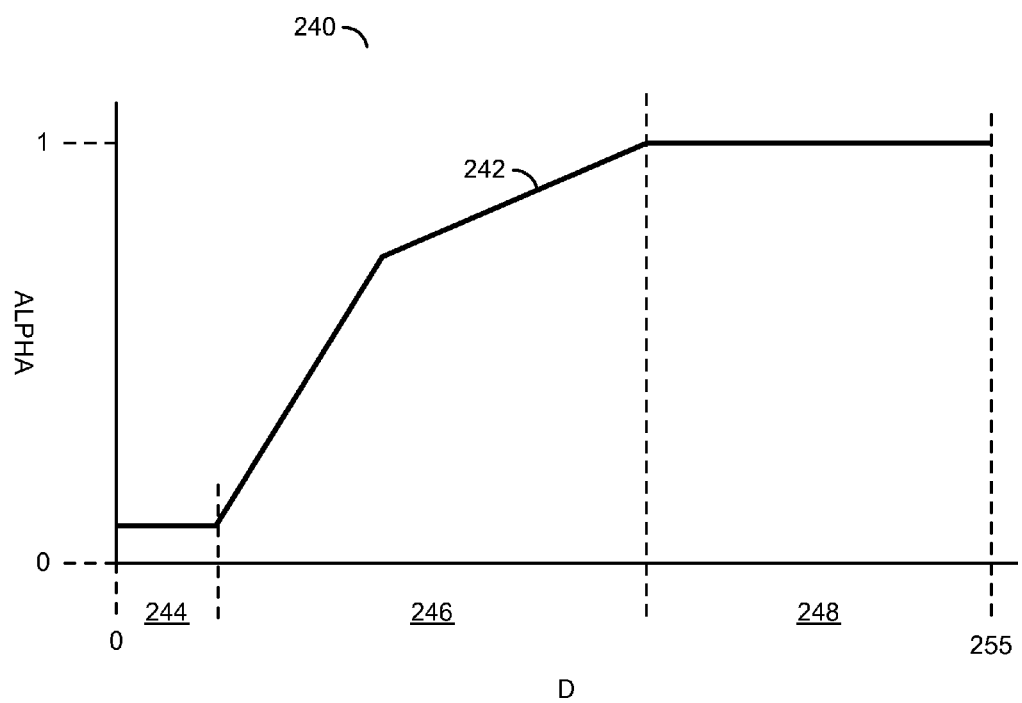
FIG. 7 is a diagram of a blending curve.

Referring to FIG. 7, a diagram 240 of an example blending curve 242 is shown. A strength of the temporal filtering (or blending) may be a continuum for one or more filter strengths. The diagram 240 generally illustrates a range of medium filter strengths and fixed filter strengths. A degree of filtering may depend on the blending curve 242.

An example of blending is generally determined as follows:

T=target (current) sample;
R=reference (previous) sample;
D=detected motion score; and
Alpha (curve 242)=lookup of the value D.

A filtered result (sample) may be calculated by formula 2 as follows:

$$\text{Result} = (\text{Alpha} \times T) + ((1 - \text{Alpha}) \times R) \tag{2}$$

In the diagram 240, the X axis generally represents the detected motion value D (e.g., the combined motion score of the target frame N). For 8-bit levels of detected motion, the X axis is generally labeled from 0 to 255. The Y axis generally represents an alpha value and ranges from 0 (zero) to 1 (unity). Other ranges of D and alpha may be implemented to meet the criteria of a particular application. Other techniques for determining the value D may also be implemented, such as considering several target samples simultaneously.

Small detected motion values D may be illustrated in the section 244. The section 244 generally results in a low value of alpha per the blending curve 242. Medium (or intermediate) detected motion values D may be illustrated in the section 246. The section 246 generally results in a range of values for alpha per the blending curve 242. Large detected motion values of D may be illustrated in the section 248. The section 248 generally results in a high value of alpha per the blending curve 242.

Where slow or no motion is detected, the value D is small and in the section 244. Therefore, the value alpha may be small (and optionally a fixed value). Per formula 2, the small value alpha generally weights the blending to favor the reference sample, or in some cases (e.g., alpha=0.5) averages the reference sample with the target sample. Such blending may be considered a strong filtering. Where medium motion is detected, the value D may be medium and in the section 246. Thus, the value alpha may be medium. Per formula 2, the medium value alpha variably weights the blending between the target sample and the reference sample, depending on the level of motion. Such blending may be considered a medium filtering. Where fast motion is detected, the value D may be large and in the section 248. Therefore, the value alpha may be large and weights the blending to favor the target sample. Such blending is generally considered a weak filtering. Where the value alpha=1, no filtering is accomplished and the target sample is unchanged.

In various embodiments, the blending curve 242 may be implemented as one or more LUTs. For example, a single LUT (e.g., LUT 204) may store all points of the blending curve 242. The value D may be implemented as the combined score value.

In other embodiments, different LUTs may store different blending curves and/or different portions of one or more blending curves. Selection of a particular LUT is generally based on the combined score value. For example, if the combined score is zero, an LUT number 0 may be utilized. If the combined score is greater than zero and less than a threshold T1, an LUT number 1 may be utilized. If the combined score is greater than the threshold T1 and less than a threshold T2, an LUT number 2 may be utilized. If the combined score is greater than the threshold T2, an LUT number 3 is generally utilized. Other numbers of LUTs may be implemented to meet the criteria of a particular application.

In some embodiments, the combined score may be a lookup table number. The number of LUTs may be clamped per formula 3 as follows to a maximum value to avoid having too many LUTs:

$$\text{Table}=\min(\text{combined score, number of tables}-1) \quad (3)$$

In various embodiments, the combined score may be used to scale the value D received by the curve 242 or the LUT 204. The scaling may be implemented per formula 4 as follows:

$$D\_used = D\_before\_multiplication \times \text{combined score} \quad (4)$$

In other embodiments, the combined score may be used to offset the value D received by the curve 242 or the LUT 204. The offsetting may be implemented per formula 5 as follows:

$$D\_used = D\_before\_offset + \text{combined score} \quad (5)$$

The functions and structures illustrated in the diagrams of FIGS. 1-7 may be designed, modeled and simulated using one or more of a conventional general purpose processor, digital computer, microprocessor, microcontroller and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally embodied in a medium or several media, for example a non-transitory storage media, and may be executed by one or more of the processors. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for motion detection based on observing several pictures, comprising the steps of:
computing a first motion score of an area in a target picture in a sequence of pictures by a comparison of said area between said target picture and a first reference picture in said sequence of pictures;
computing a second motion score of said area by another comparison of said area between a second reference picture in said sequence of pictures and a third reference picture in said sequence of pictures;
determining a maximum score among (i) said first motion score that is based on said target picture and (ii) said second motion score that is based on said second reference picture and said third reference picture;
combining said first motion score and said maximum score to generate a combined motion score; and
temporal filtering said target picture with said first reference picture based on said combined motion score, wherein (i) at least one of said computing of said first motion score, said computing of said second motion score, and said temporal filtering is controlled by one or more gain settings applied to said sequence of pictures in a circuit, (ii) at least two of said first reference picture, said second reference picture, and said third reference picture are different pictures and (iii) said target picture is a different picture than said first reference picture, said second reference picture and said third reference picture.

2. The method according to claim 1, where (i) said computing of said combined motion score is controlled by one or more parameters, and (ii) at least one of said parameters depends on at least one of said gain settings.

3. The method according to claim 1, wherein said combined motion score is read from a lookup table indexed by said first motion score and said maximum score.

4. The method according to claim 1, further comprising the step of:

transforming said first motion score based on said combined motion score prior to said temporal filtering to generate a transformed motion score, wherein a strength of said temporal filtering is based on said transformed motion score.

5. The method according to claim 4, wherein (i) said transforming comprises a plurality of transformations, and (ii) said transformed motion score is determined by one of said transformations selected by said combined motion score.

6. The method according to claim 4, wherein said transforming comprises a multiplication of said first motion score by said combined motion score.

7. The method according to claim 4, wherein said transforming comprises an addition of said combined motion score to said first motion score.

8. The method according to claim 1, further comprising the step of:

motion compensating said third reference picture relative to said second reference picture prior to said computing of said second motion score.

9. An apparatus comprising:

an interface configured to receive a sequence of pictures; and a circuit configured to (i) compute a first motion score of an area in a target picture in said sequence of pictures by a comparison of said area between said target picture and a first reference picture in said sequence of pictures, (ii) compute a second motion score of said area by another comparison of said area between a second reference picture in said sequence of pictures and a third reference picture in said sequence of pictures, (iii) determine a maximum score among (a) said first motion score that is based on said target picture and (b) said second motion scores that are based on said second reference picture and said third reference picture, (iv) combine said first motion score and said maximum score to generate a combined motion score and (v) temporal filter said target picture with said first reference picture based on said combined motion score, wherein (a) at least one of said computation of said first motion score, said computation of said second motion score, and said temporal filter is controlled by one or more gain settings applied to said sequence of pictures, (b) at least two of said first reference picture, said second reference picture, and said third reference picture are different pictures and (c) said target picture is a different picture than said first reference picture, said second reference picture and said third reference picture.

10. The apparatus according to claim 9, where (i) said computation of said combined motion score is controlled by one or more parameters, and (ii) at least one of said parameters depends on at least one of said gain settings.

11. The apparatus according to claim 9, wherein said combined motion score is read from a lookup table indexed by said first motion score and said maximum score.

12. The apparatus according to claim 9, wherein (i) said circuit is further configured to perform a transform of said first motion score based on said combined motion score prior to said temporal filter to generate a transformed motion score, and (ii) a strength of said temporal filter is based on said transformed motion score.

13. The apparatus according to claim 12, wherein (i) said transform comprises a plurality of transformations, and (ii) said transformed motion score is determined by one of said transformations selected by said combined motion score.

14. The apparatus according to claim 12, wherein said transform comprises a multiplication of said first motion score by said combined motion score.

15. The apparatus according to claim 12, wherein said transform comprises an addition of said combined motion score to said first motion score.

16. The apparatus according to claim 9, wherein said circuit is further configured to motion compensate said third reference picture relative to said second reference picture prior to said computation of said second motion score.

* * * * *